(12) United States Patent
Hsu (10) Patent No.: US 8,245,172 B2
(45) Date of Patent: *Aug. 14, 2012

(54) METHODS AND APPARATUS FOR DEFINING MANHATTAN POWER GRID STRUCTURES HAVING A REDUCED NUMBER OF VIAS

(75) Inventor: Hengfu Hsu, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/611,116

(22) Filed: Nov. 2, 2009

(65) Prior Publication Data
US 2010/0044875 A1 Feb. 25, 2010

Related U.S. Application Data

(60) Continuation of application No. 11/780,459, filed on Jul. 19, 2007, now Pat. No. 7,631,283, which is a division of application No. 10/452,189, filed on Jun. 1, 2003, now Pat. No. 7,272,803.

(51) Int. Cl.
*G06F 17/50* (2006.01)

(52) U.S. Cl. ........ 716/120; 716/118; 716/119; 716/126; 716/130; 716/133; 716/135

(58) Field of Classification Search ................. 716/126, 716/129, 132, 133, 135, 118, 119, 120, 130; 257/207, 773
See application file for complete search history.

(56) References Cited

U.S. PATENT DOCUMENTS

| | | |
|---|---|---|
| 5,767,011 A | 6/1998 | Yao et al. |
| 6,086,627 A | 7/2000 | Bass, Jr. et al. |
| 6,111,756 A | 8/2000 | Moresco |
| 6,202,191 B1 | 3/2001 | Filippi et al. |
| 6,305,000 B1 | 10/2001 | Phan et al. |
| 6,308,307 B1 | 10/2001 | Cano et al. |
| 6,385,758 B1 | 5/2002 | Kikuchi et al. |
| 6,388,332 B1 | 5/2002 | Aggarwal et al. |
| 6,421,819 B1 | 7/2002 | Masukawa |

(Continued)

FOREIGN PATENT DOCUMENTS

WO    WO 2004/109753    12/2004

OTHER PUBLICATIONS

Portions of prosecution history of U.S. Appl. No. 10/452,100, Sep. 6, 2005, Hsu, Hengfu.

(Continued)

*Primary Examiner* — Sun Lin
(74) *Attorney, Agent, or Firm* — Adeli & Tollen LLP (57) ABSTRACT

A method for defining and producing a power grid structure (having stripe, rail, and via components) of an IC. The method reduces the number of vias in the power grid structure and the diagonal wiring blockage caused by the vias while still meeting design specifications. Other embodiments provide a method for locating vias in the power grid structure in such a way as to be especially beneficial to 45° or 135° diagonal wiring paths. The method includes processes of a power grid planner, power grid router, power grid verifier, and global signal router that are used iteratively to define and produce a power grid structure. Other embodiments of the invention provide for arrangements of vias in via arrays where diagonal wiring paths are facilitated near the edges of the via arrays. A bounding box enclosing these via arrays have an aspect ratio that is approximately equal to 1.

20 Claims, 9 Drawing Sheets

U.S. PATENT DOCUMENTS

| | | |
|---|---|---|
| 6,437,431 B1 | 8/2002 | Mbouombouo et al. |
| 6,446,245 B1 | 9/2002 | Xing et al. |
| 6,467,074 B1 | 10/2002 | Katsioulas et al. |
| 6,484,293 B1 | 11/2002 | Starr |
| 6,523,154 B2 | 2/2003 | Cohn et al. |
| 6,538,314 B1 | 3/2003 | Buffet et al. |
| 6,553,554 B1 | 4/2003 | Dahl et al. |
| 6,581,201 B2 | 6/2003 | Cano et al. |
| 6,598,206 B2 | 7/2003 | Darden et al. |
| 6,622,294 B2 | 9/2003 | Saxena et al. |
| 6,657,130 B2 | 12/2003 | Van Dyke et al. |
| 6,675,139 B1 | 1/2004 | Jetton et al. |
| 6,701,509 B2 | 3/2004 | Aggarwal et al. |
| 6,711,727 B1 | 3/2004 | Teig et al. |
| 6,795,957 B2 | 9/2004 | Lai et al. |
| 6,880,143 B1 | 4/2005 | Yu |
| 6,948,146 B2 | 9/2005 | Allen et al. |
| 7,003,748 B1 | 2/2006 | Hsu |
| 7,086,024 B2 | 8/2006 | Hsu et al. |
| 7,272,803 B1 | 9/2007 | Hsu |
| 7,480,887 B1 | 1/2009 | Hsu |
| 7,631,283 B2 | 12/2009 | Hsu |
| 2002/0013931 A1 | 1/2002 | Cano et al. |
| 2002/0170020 A1 | 11/2002 | Darden et al. |
| 2004/0139417 A1 | 7/2004 | Allen et al. |
| 2005/0023705 A1 | 2/2005 | Campbell et al. |

OTHER PUBLICATIONS

Portions of prosecution history of U.S. Appl. No. 11/339,330, Dec. 4, 2008, Hsu, Hengfu.

Portions of prosecution history of U.S. Appl. No. 10/452,189, May 11, 2007, Hsu, Hengfu.

Portions of prosecution history of U.S. Appl. No. 11/780,459, Oct. 23, 2009, Hsu, Hengfu.

Portions of prosecution history of U.S. Appl. No. 10/452,848, Mar. 13, 2006, Hsu, Hengfu, et al.

International Search Report and Written Opinion of PCT/US2004/015182, Aug. 21, 2008, Cadence Design Systems, Inc.

Bobba, Vijay S., et al., "A Parameter-Driven Router", Proceedings of the 23rd ACM/IEEE Design Automation Conference, 1986 (Month NA), pp. 810-818, Las Vegas, NV.

Chowdhury, S., et al., "Optimum Design of IC Power/Ground Nets subject to Reliability Constraints", IEEE Transactions on Computer-Aided Design of Integrated Circuits and Systems, Jul. 1988, pp. 787-796, vol. 7, No. 7.

Moulton, Anderew S., "Laying the Power and Ground Wires on a VLSI Chip", Proceedings of the $20^{th}$ ACM/IEEE Design Automation Conference, 1983 (Month NA), pp. 754-755, Miami Beach, FL.

Teig, Steven L., "The X Architecture: Not Your Father's Diagonal Wiring", Proceedings of the 2002 ACM International Workshop on System-level Interconnect Prediction, Apr. 2002, pp. 33-37, San Diego, CA.

Wang, Deborah C., "Novel Routing Schemes for IC Layout, Part I: Two-Layer Channel Routing", Proceedings of the $28^{th}$ ACM/IEEE Design Automation Conference, 1991 (Month NA), pp. 49-53, San Francisco, CA.

International Preliminary Report on Patentability for PCT/US2004/05182, Jun. 16, 2009, Cadence Design Systems, Inc.

METHODS AND APPARATUS FOR DEFINING MANHATTAN POWER GRID STRUCTURES HAVING A REDUCED NUMBER OF VIAS

CLAIM OF BENEFIT TO PRIOR APPLICATIONS

This application is a continuation application of U.S. patent application Ser. No. 11/780,459, now issued U.S. Pat. No. 7,631,283, entitled "Methods and Apparatus for Defining Manhattan Power Grid Structures Having a Reduced Number of Vias", filed Jul. 19, 2007 now U.S. Pat. No. 7,631,283. U.S. patent application Ser. No. 11/780,459 is a divisional application of U.S. patent application Ser. No. 10/452,189, now issued U.S. Pat. No. 7,272,803, entitled "Methods and Apparatus for Defining Manhattan Power Grid Structures Having a Reduced Number of Vias", filed Jun. 1, 2003. U.S. patent application Ser. No. 11/780,459, now issued U.S. Pat. No. 7,631,283, and U.S. Pat. No. 7,272,803 are incorporated herein by reference.

FIELD OF THE INVENTION

The invention is directed towards methods and apparatus for defining Manhattan power grid structures having a reduced number of vias for use in an integrated circuit.

BACKGROUND OF THE INVENTION

An integrated circuit ("IC") is a device (e.g., a semiconductor device) that includes many electronic components, such as transistors, resistors, diodes, etc. These components are often interconnected to form multiple circuit components, such as gates, cells, memory units, arithmetic units, controllers, decoders, etc. An IC includes multiple layers of signal wiring that interconnect its electronic and circuit components. Traditionally, IC's use preferred direction ("PD") wiring models, which specify a preferred wiring direction for each of their wiring layers. In preferred direction wiring models, the preferred direction typically alternates between successive wiring layers.

One example of a PD wiring model is the PD Manhattan wiring model, which specifies alternating layers of preferred-direction horizontal and vertical wiring. Another example of a PD wiring model is the PD diagonal wiring model, which specifies alternating layers of preferred-direction diagonal wiring. The PD diagonal wiring model can allow for shorter wiring distances than the PD Manhattan wiring model and can decrease the total wirelength needed to interconnect the electronic and circuit components of an IC. The PD diagonal wiring model is described in detail in U.S. patent application Ser. No. 10/334,690, now issued as U.S. Pat. No. 6,988,257, filed Dec. 31, 2002, entitled "Method and Apparatus for Routing," incorporated herein by reference and in U.S. patent application Ser. No. 10/013,819, now issued as U.S. Pat. No. 7,003,754, filed Dec. 7, 2001, entitled "Routing Method and Apparatus That Use Diagonal Routes," incorporated herein by reference.

Design engineers design IC's by transforming logical or circuit descriptions of the IC's into geometric descriptions, called layouts. IC layouts typically include (1) circuit modules (i.e., geometric representations of electronic or circuit IC components) with signal pins, and (2) interconnect lines (i.e., geometric representations of signal wiring) that connect the signal pins of the circuit modules. A signal net is typically defined as a collection of signal pins that need to be connected.

To create layouts, design engineers typically use electronic design automation ("EDA") applications. These applications provide sets of computer-based tools for creating, editing, and analyzing IC design layouts. One EDA tool is a signal wire router that defines routes for interconnect lines that connect the signal pins of signal nets. Signal wire routing is generally divided into two phases: global signal routing and detailed signal routing. For each signal net, global signal routing generates a "loose" route for the interconnect lines that are to connect the signal pins of the signal net. The "looseness" of a global signal route depends on the particular global signal router used. After global signal routes have been created, the detailed signal routing creates specific individual routes for each signal net. A signal wire router that consistently explores diagonal routing directions (referred to herein as a diagonal wire router) is described in the aforementioned patent application titled "Method and Apparatus for Routing."

Each IC also contains a power grid structure that provides power and ground to each electronic and circuit component of an IC. Each electronic or circuit IC component has a power pin and a ground pin that is connected to the power grid structure. A power net is typically defined as a collection of power pins that need to be connected and a ground net is typically defined as a collection of ground pins that need to be connected.

Power grid structure components include stripes, rails, and vias which must be of a certain strength (i.e., size) to meet design specifications (i.e., minimum specifications that the power grid structure must meet in order to be acceptable for use in the IC). Power grid components, however, compete with signal wiring for area on an IC layer since they take up area on the IC layer that signal wiring could otherwise occupy. Also, power grid structure components can cause substantial blockage of signal wiring paths, especially on layers with the PD diagonal wiring model.

Figure 1:
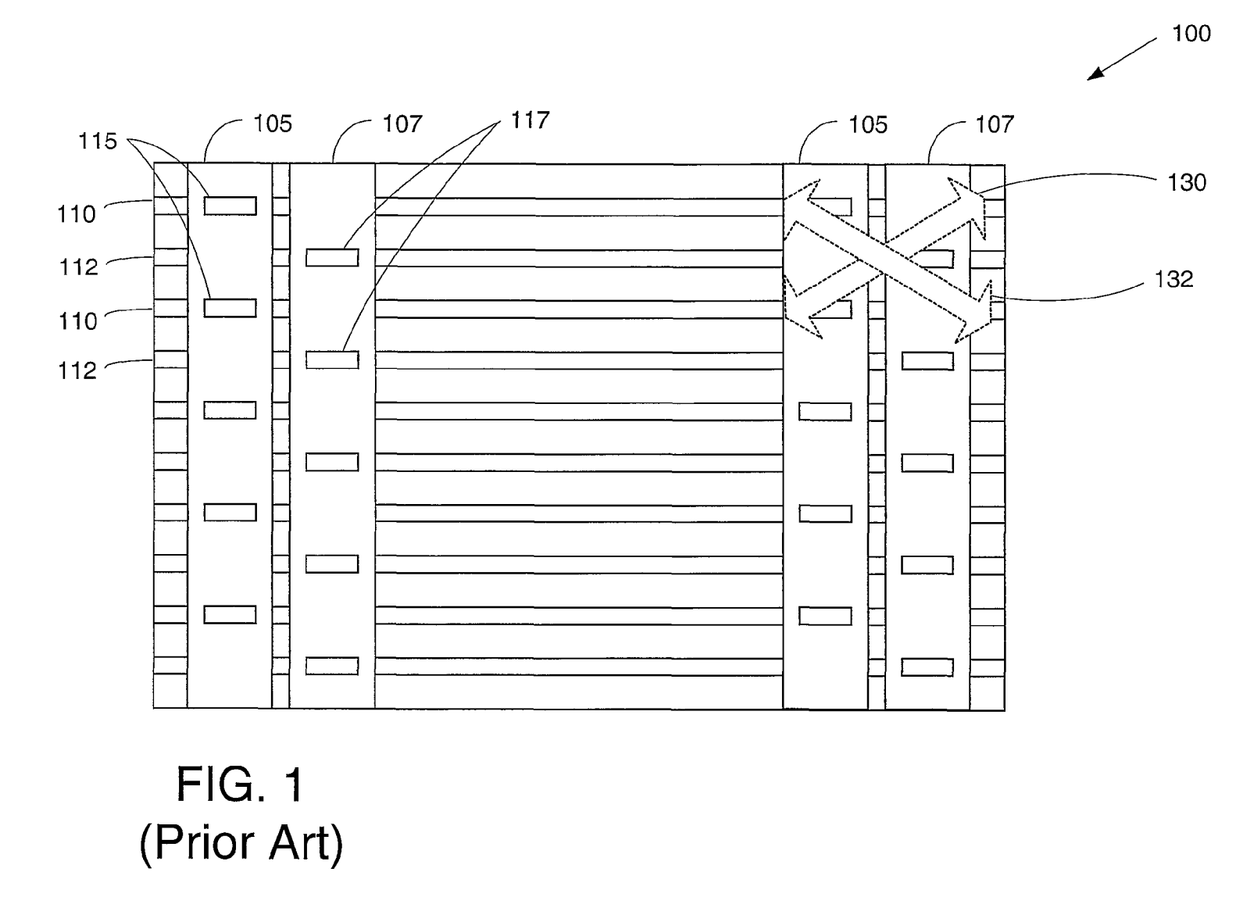
FIG. 1 illustrates a top view of a region of an IC layout having a conventional power grid structure.

FIG. 1 illustrates a top view of a region of an IC layout having a conventional power grid structure 100. The power grid structure 100 includes stripes 105 and 107, rails 110 and 112, and vias 115 and 117. Stripes 105 and 107 are typically positioned vertically (i.e., parallel to the layout's y-coordinate axis) across an upper layer of the IC and provide power and ground to the IC. A stripe that carries power is referred to as a power stripe 105 and a stripe that carries ground is referred to as a ground stripe 107.

Rails 110 and 112 are typically positioned horizontally (i.e., parallel to the layout's x-coordinate axis) across at least one lower layer of the IC. Each rail is connected to a stripe through vias. A rail connected to a power stripe 105 is referred to as a power rail 110 and a rail connected to a ground stripe 107 is referred to as a ground rail 112.

Vias 115 and 117 are positioned perpendicular to the IC's layers (i.e., parallel to the layout's z-coordinate axis) and distribute power or ground from the stripes to the rails. A via that connects a power stripe 105 to a power rail 110 is referred to as a power via 115 and a via that connects a ground stripe 107 and a ground rail 112 is referred to as a ground via 117.

Multiple vias are arranged in a via array which is used to connect a stripe to a rail. For illustrative purposes, FIG. 1 shows a top view of a via array as enclosed by a rectangular bounding box, the via array being comprised of multiple vias. Since the vias of the power grid structure are positioned upright through the IC, they can cause blocking of the signal wiring needed to interconnect the electronic and circuit components of the IC. The amount of wiring blockage varies from layer to layer depending on the PD wiring model of the layer. As shown in FIG. 1, a 45° diagonal direction arrow 130 and a 135° diagonal direction arrow 132 illustrate how diagonal wiring paths are blocked by vias 115 and 117 of the conventional power grid structure 100.

Conventionally, design engineers manually define the power grid structure by methods of trial and error. For example, designer engineers typically estimate stripe width and stripe spacing values (the distance from one stripe to the next) based on prior experience. Also, a power via 115 (or power via array) is typically located at every intersection of a power stripe 105 and power rail 110 and a ground via 117 (or ground via array) is typically located at every intersection of a ground stripe 107 and ground rail 112. Placing a power via (or power via array) at every power stripe and power rail intersection and a ground via (or ground via array) at every ground stripe and ground rail intersection typically places more vias (or via arrays) in the power grid structure than necessary to meet design specifications for the power grid structure. Thus, the vias of the power grid structure take up more area and cause more signal wiring blockage than necessary on an IC layer. As such, there is a need for an automated method and apparatus for reducing the number of vias (or via arrays) in a power grid structure while still meeting the design specifications for the power grid structure.

Figure 8:
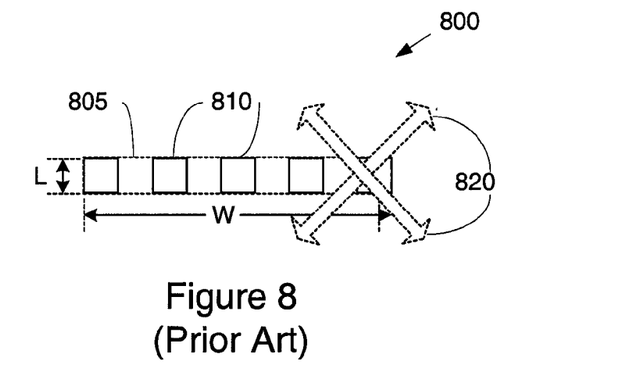
FIG. 8 shows a top view of a conventional via array.

In addition, multiple vias are typically arranged in a via array that causes significant diagonal wiring blockage near the edges of the via array. FIG. 8 shows a top view of a conventional via array 800. The via array 800 is enclosed by a rectangular bounding box 805 and is comprised of multiple vias 810. Diagonal direction arrows 820 illustrate how diagonal wiring paths are blocked by vias 810 near the edges of the via array 800. Therefore, there is also a need for via arrays having via arrangements that do not cause significant diagonal wiring blockage near the edges of the via array.

SUMMARY OF THE INVENTION

Some embodiments of the invention provide a method for defining and producing a power grid structure (having stripe, rail, and via components) of an IC with a reduced number of vias (or via arrays). The method reduces the area of the power grid structure and the diagonal wiring blockage caused by the power grid structure while still meeting design specifications. Other embodiments of the invention provide a method for locating vias (or via arrays) in the power grid structure in such a way as to be especially beneficial to 45° or 135° diagonal wiring paths. The method includes processes of a power grid planner, power grid router, power grid verifier, and global signal router that are used iteratively to define and produce a power grid structure.

The processes of the power grid planner include receiving design specifications and sending the design specifications to the power grid verifier. The power grid planner also receives dimensions and locations of power grid components for each IC layer and sends the dimensions and locations to the power grid router. The dimensions and locations of power grid components place a power via (or power via array) at every power stripe and power rail intersection and a ground via (or ground via array) at every ground stripe and ground rail intersection.

The power grid router receives the dimensions and locations of the power grid components and physically lays down the power grid components for each layer of the IC. The power grid verifier tests the resulting power grid structure to determine if the power grid structure meets the design specifications. If the power grid structure meets the design specifications, the global signal router performs global signal routing operations for each signal net of the IC.

If the global signal routing is not successful, the power grid planner modifies via or via array locations and/or reduces the number of vias or via arrays in the power grid structure to determine refined dimensions and locations of power grid components. For example, the power grid planner may change the locations of the vias or via arrays to be beneficial to 45° diagonal preferred wiring or to 135° diagonal preferred wiring. Or, the power grid planner may reduce the number of vias or via arrays in the power grid structure by locating a power via (or power via array) only at every Dth power intersection and a ground via (or ground via array) only at every Dth ground intersection, D being an integer greater than 1. The power grid planner may modify the via or via array locations and/or reduce the number of vias or via arrays by methods of trial and error or by using predetermined formulas.

The power grid planner then determines refined dimensions and locations for the power grid components given any modifications that were made. The processes of the power grid planner, the power grid router, the power grid verifier, and the global signal router repeat in an iterative loop that modifies the via or via array locations and/or reduces the number of vias or via arrays until the global signal routing is successful.

Other embodiments of the invention provide for arrangements of vias in via arrays where diagonal wiring paths are facilitated near the edges of the via arrays. A bounding box enclosing these via arrays have an aspect ratio that is approximately equal to 1.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for defining and producing a power grid structure (having stripe, rail, and via components) of an IC with a reduced number of vias (or via arrays). The method reduces the area of the power grid structure and the diagonal wiring blockage caused by the power grid structure while still meeting design specifications. Other embodiments of the invention provide a method for locating vias (or via arrays) in the power grid structure in such a way as to be especially beneficial to 45° or 135° diagonal wiring paths. The method includes processes of a power grid planner, power grid router, power grid verifier, and global signal router that are used iteratively to define and produce a power grid structure.

The processes of the power grid planner include receiving design specifications and sending the design specifications to the power grid verifier. The power grid planner also receives dimensions and locations of power grid components for each IC layer and sends the dimensions and locations to the power grid router. The dimensions and locations of power grid components place a power via (or power via array) at every power stripe and power rail intersection and a ground via (or ground via array) at every ground stripe and ground rail intersection.

The power grid router receives the dimensions and locations of the power grid components and physically lays down the power grid components for each layer of the IC. The power grid verifier tests the resulting power grid structure to determine if the power grid structure meets the design specifications. If the power grid structure meets the design specifications, the global signal router performs global signal routing operations for each signal net of the IC.

If the global signal routing is not successful, the power grid planner modifies via or via array locations and/or reduces the number of vias or via arrays in the power grid structure to determine refined dimensions and locations of power grid components. For example, the power grid planner may change the locations of the vias or via arrays to be beneficial to 45° diagonal preferred wiring or to 135° diagonal preferred wiring. Or, the power grid planner may reduce the number of vias or via arrays in the power grid structure by locating a power via (or power via array) only at every Dth power intersection and a ground via (or ground via array) only at every Dth ground intersection, D being an integer greater than 1. The power grid planner may modify the via or via array locations and/or reduce the number of vias or via arrays by methods of trial and error or by using predetermined formulas.

The power grid planner then determines refined dimensions and locations for the power grid components given any modifications that were made. The processes of the power grid planner, the power grid router, the power grid verifier, and the global signal router repeat in an iterative loop that modifies the via or via array locations and/or reduces the number of vias or via arrays until the global signal routing is successful.

The above described embodiments of the invention are described below in relation to section I. Other embodiments of the invention provide for arrangements of vias in via arrays where diagonal wiring paths are facilitated near the edges of the via arrays. A bounding box enclosing these via arrays have an aspect ratio that is approximately equal to 1. These embodiments are described below in relation to section II.

In the embodiments described below, the power grid structure is described in relation to a six-layer wiring model that has horizontal wiring on wiring layer 1, vertical wiring on wiring layer 2, horizontal wiring on wiring layer 3, 45° diagonal wiring on wiring layer 4, 135° diagonal wiring on wiring layer 5, and vertical wiring on wiring layer 6. One of ordinary skill in the art will realize that the power grid structure can be used in other wiring models in other embodiments. In some embodiments, an interconnect line is "diagonal" if it forms an angle other than 0° or 90° with respect to the layout's Cartesian coordinate axes, which are typically parallel with the layout's boundary and/or the boundary of the layout's expected IC. A component or interconnect line is "horizontal" or "vertical" if it forms an angle of 0° or 90° with respect to one of the coordinate axes of the layout.

In some embodiments described below, stripes of a power grid structure are positioned vertically (i.e., parallel to the layout's y-coordinate axis) across a top layer of the IC and rails of a power grid structure are positioned horizontally (i.e., parallel to the layout's x-coordinate axis) across a lower layer of the IC. One of ordinary skill in the art will realize that the stripes may be positioned horizontally and/or be laid on a different layer or on multiple layers of the IC in other embodiments. One of ordinary skill in the art will also realize that the rails may be positioned vertically and/or may be laid on a different layer or on multiple layers of the IC in other embodiments. Power grid structures having stripes positioned vertically or horizontally and rails positioned vertically or horizontally are referred to as Manhattan power grid structures.

As used herein, the term "intersection" refers to a location where a stripe and rail cross in terms of an IC layout's x and y-coordinate axes, and does not refer to an actual physical intersection of the stripe and rail.

Figure 2:
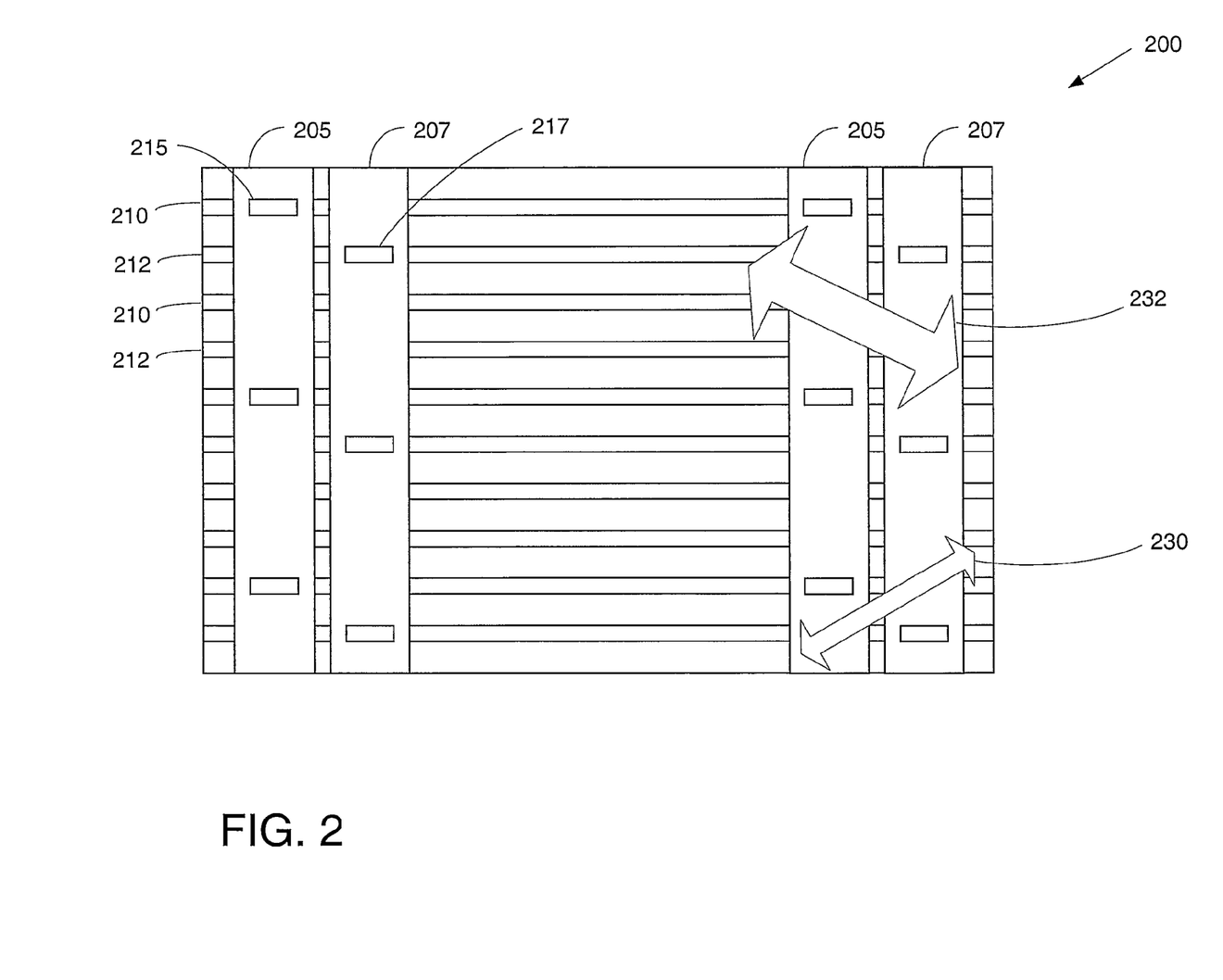
FIG. 2 illustrates a top view of a region of an IC layout having a power grid structure with a reduced number of vias in accordance with the present invention.

I. FIG. 2 illustrates a top view of a region of an IC layout having a power grid structure 200 with a reduced number of vias in accordance with the present invention. The power grid structure 200 includes stripes 205 and 207, rails 210 and 212, and vias 215 and 217.

Stripes are positioned parallel to one another and vertically (i.e., parallel to the layout's y-coordinate axis) across a top layer of the IC and provide power and ground to the IC. A stripe that carries power is referred to as a power stripe 205 and a stripe that carries ground is referred to as a ground stripe 207. A stripe is defined by its width (in terms of x-coordinates of the layout) and its location on the layer. The locations of power stripes 205 are defined by a distance (in terms of x-coordinates) from an edge of the layout of a first power stripe 205 and a distance defined by a stripe spacing width (in terms of x-coordinates) between power stripes 205 thereafter. The locations of ground stripes 207 are defined by a distance (in terms of x-coordinates) from an edge of the layout of a first ground stripe 207 and a distance defined by the stripe spacing width (in terms of x-coordinates) between ground stripes 207 thereafter.

Power and ground stripes may be evenly spaced (i.e., the distance between a power and ground stripe is uniform throughout the power grid structure) or unevenly spaced (i.e., the distance between a power and ground stripe is not uniform throughout the power grid structure). In the example shown in FIG. 2, the power grid structure 200 has unevenly spaced power and ground stripes since the distance between a power stripe 205 and a ground stripe 207 is different than the distance between a next power stripe 205 and the ground stripe 207.

Rails 210 and 212 are positioned parallel to one another and horizontally (i.e., parallel to the layout's x-coordinate axis) across at least one lower layer of the IC. Each rail is connected to a stripe through vias. Although some rails in the region of the IC layout shown in FIG. 2 are not shown to be connected to a stripe through vias, each rail is connected to a stripe through vias at least once in the entirety of the IC layout. A rail connected to a power stripe 205 is referred to as a power rail 210 and a rail 210 connected to a ground stripe 207 is referred to as a ground rail 212. Power and ground rails 210 and 212 are placed in a perpendicular position relative to the power and ground stripes 205 and 207 so that power stripe and power rail intersections are formed (in terms of the IC layout's x and y-coordinate axes) and ground stripe and ground rail intersections are formed (in terms of the IC layout's x and y-coordinate axes).

A power rail 210 and a ground rail 212 are connected to each electronic and circuit component (not shown) of the IC through the power pin and ground pin, respectively, of the electronic or circuit component. A rail is defined by its width (in terms of y-coordinates) and its location on the layer. The locations of the rails are defined by a distance (in terms of y-coordinates) from an edge of the layout of a first rail and a distance defined by a rail spacing width (in terms of y-coordinates) between rails thereafter.

Vias 215 and 217 are positioned perpendicular to the IC's layers (i.e., parallel to the layout's z-coordinate axis) and distribute power or ground from the stripes to the rails. Multiple vias are arranged in a via array which is used to connect a stripe to a rail. For illustrative purposes, FIG. 2 shows a top view of a via array as enclosed by a bounding box, the via array being comprised of multiple vias.

A via (or a via array comprised of multiple vias) spans from one layer to a next adjacent layer of the IC. To span several layers, several vias (or several via arrays) are stacked from one layer to another. Stacked vias (or stacked via arrays) are used to span more than one layer to connect stripes (typically located on the top layer) to rails (typically located on a lower layer). A via (or via array) that connects (either directly or through another via) a power stripe 205 and a power rail 210 is referred to as a power via 215 (or power via array). A via that connects (either directly or through another via) a ground stripe 207 and a ground rail 212 is referred to as a ground via 217 (or ground via array).

Areas between the vias on the layout define wiring tracks (i.e., wiring capacity) where signal wiring required for the IC layout (i.e., wiring demand) can be routed. Wiring tracks that allow horizontal, vertical, or diagonal wiring on the layout are referred to as horizontal, vertical, or diagonal wiring tracks, respectively. Layouts having relatively large amounts of horizontal wiring tracks are beneficial to horizontal wiring paths and layers having horizontal preferred wiring, for example, layers 1 and 3 of the six-layer wiring model. Layouts having relatively large amounts of vertical wiring tracks are beneficial to vertical wiring paths and layers having vertical preferred wiring, for example, layer 2 of the six-layer wiring model. Layouts having relatively large amounts of 45° diagonal wiring tracks are beneficial to 45° diagonal wiring paths and layers having 45° diagonal preferred wiring, for example, layer 4 of the six-layer wiring model. Layouts having relatively large amounts of 135° diagonal wiring tracks are beneficial to 135° diagonal wiring paths and to layers having 135° diagonal preferred wiring, for example, layer 5 of the six-layer wiring model.

Note that in the power grid structure 200 of the present invention, a power via 215 (or power via array) is not located at every power stripe 205 and power rail 210 intersection (i.e., power intersection) and a ground via 217 (or ground via array) is not located at every intersection of a ground stripe 207 and ground rail 212 (i.e., ground intersection). In the example shown in FIG. 2, a power via 215 (or power via array) is located only at every $2^{nd}$ power intersection and a ground via 217 (or ground via array) is located only at every $2^{nd}$ ground intersection. In other embodiments, a power via 215 (or power via array) is located only at every Dth power intersection and a ground via 217 (or ground via array) is located only at every Dth ground intersection, D being an integer greater than 1.

Therefore, the power grid structure 200 of the present invention has a reduced number of vias (or via arrays) relative to conventional power grid structures. This allows larger wiring tracks between the vias of the power grid structure 200 relative to the wiring tracks between the vias of a conventional power grid structure. Also, the power and ground vias 215 and 217 of the power grid structure 200 are located in a particular pattern that is especially beneficial to 135° diagonal wiring paths. Such a pattern of power and ground vias 215 and 217 can be produced by a predetermined formula, as described in relation to FIG. 7. A 45° diagonal direction arrow 230 and a 135° diagonal direction arrow 232 illustrate how a 135° diagonal wiring track is larger than a 45° diagonal wiring track between vias 215 and 217 of the power grid structure 200.

In some embodiments, a power grid structure has a spacing width between stripes that is an integer multiple of the spacing width between rails of the power grid structure. By having the stripe spacing width as an integer multiple of the rail spacing width, vias (which are located at the intersections of the stripes and rails) are placed in positions that do not cause substantial diagonal wiring blockage and increases the amount of diagonal signal wiring that can be routed between the vias. Methods to produce such a power grid structure is described in detail in U.S. patent application Ser. No. 10/452,100, now issued as U.S. Pat. No. 7,003,748, entitled "Methods and Apparatus for Defining Manhattan Power Grid Structures Beneficial to Diagonal Signal Wiring," filed herewith and hereby expressly incorporated herein by reference.

Figure 3:
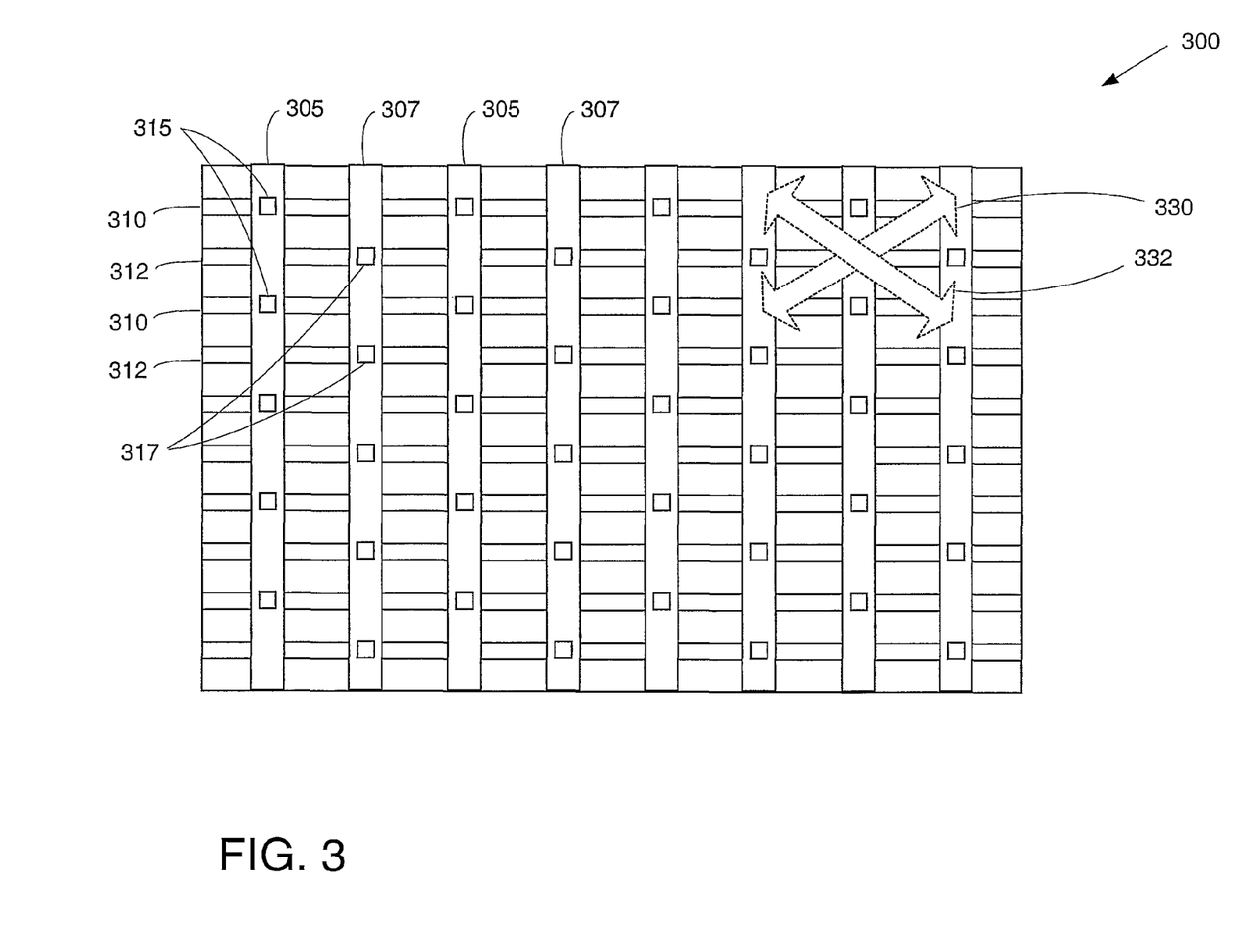
FIG. 3 illustrates a top view of a region of an IC layout having a power grid structure with a spacing width between stripes that is an integer multiple of the spacing width between rails.

FIG. 3 illustrates a top view of a region of an IC layout having a power grid structure 300 with a spacing width between stripes that is an integer multiple of the spacing width between rails. The power grid structure 300 includes power stripes 305, ground stripes 307, power rails 310, ground rails 312, power vias 315, and ground vias 317. Note that the power stripes 305 and ground stripes 307 are evenly spaced (i.e., the distance between a power stripe 305 and a ground stripe 307 is consistent throughout the power grid structure).

A 45° diagonal direction arrow 330 and a 135° diagonal direction arrow 332 illustrate how diagonal signal wiring can be routed between vias (or via arrays) of the power grid structure 300. Note that a power via 315 (or power via array) is located at every intersection of a power stripe 305 and a power rail 310 and that a ground via 317 (or ground via array) is located at every intersection of a ground stripe 307 and ground rail 312.

Figure 4:
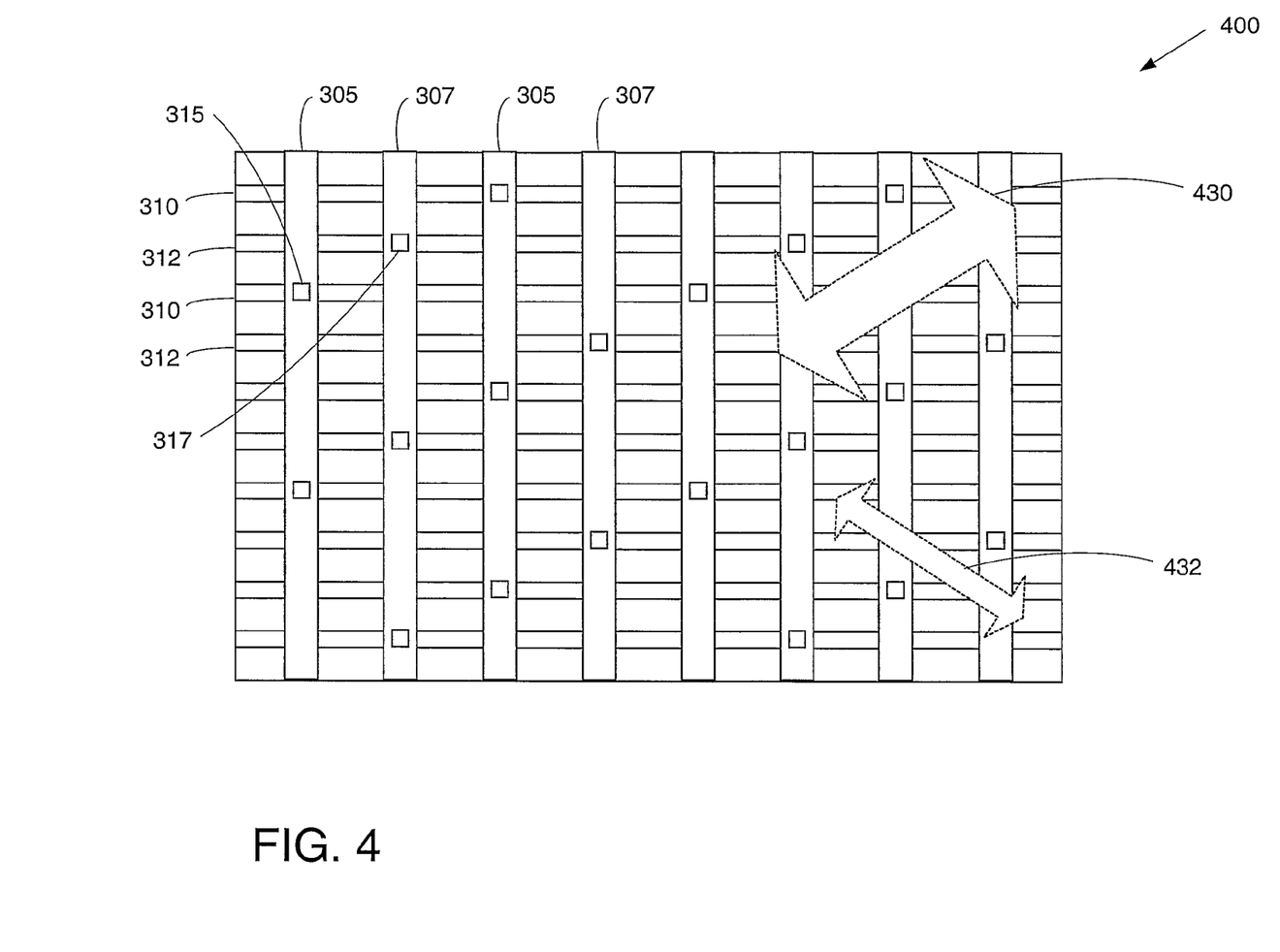
FIG. 4 illustrates a top view of a region of an IC layout having a power grid structure with a reduced number of vias that is beneficial to 45° diagonal wiring paths.

FIG. 4 illustrates a top view of a region of an IC layout having a power grid structure 400 with a reduced number of vias that is beneficial to 45° diagonal wiring paths. The power grid structure 400 is the power grid structure 300 of FIG. 3 with a reduced number of vias or via arrays. In the power grid structure 400, a power via 315 (or power via array) is not located at every power stripe 305 and power rail 310 intersection (i.e., power intersection) and a ground via 317 (or ground via array) is not located at every intersection of a ground stripe 307 and ground rail 312 (i.e., ground intersection). In the example shown in FIG. 4, a power via 315 (or power via array) is located only at every $2^{nd}$ power intersection and a ground via 317 (or ground via array) is located only at every $2^{nd}$ ground intersection. In other embodiments, a power via 315 (or power via array) is located at every Dth power intersection and a ground via 317 (or ground via array) is located at every Dth ground intersection, D being an integer greater than 1.

The reduced number of vias (or via arrays) in the power grid structure 400 relative to the power grid structure 300 of FIG. 3 allows larger wiring tracks between the vias of the power grid structure 400. The vias (or via arrays) of the power grid structure 400 have been located in a particular pattern that is especially beneficial to 45° diagonal wiring paths. Such a pattern of vias can be produced by a predetermined formula, as described in relation to FIGS. 6 (step 657) and 7 (step 740). A 45° diagonal direction arrow 430 and a 135° diagonal direction arrow 432 illustrate how a 45° diagonal wiring track is larger than a 135° diagonal wiring track between vias of the power grid structure 400.

Figure 5:
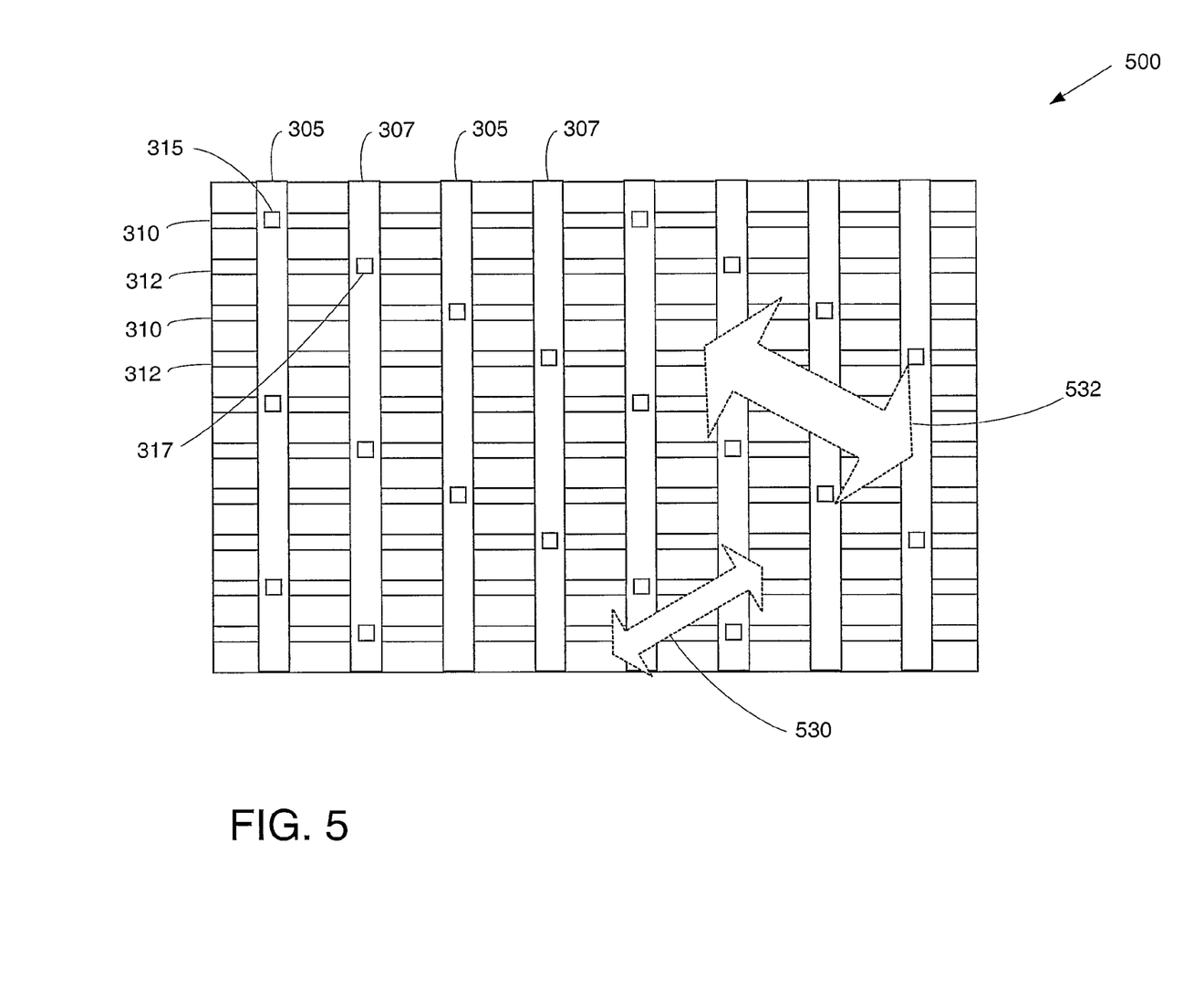
FIG. 5 illustrates a top view of a region of an IC layout having a power grid structure with a reduced number of vias that is beneficial to 135° diagonal wiring paths.

FIG. 5 illustrates a top view of a region of an IC layout having a power grid structure 500 with a reduced number of vias that is beneficial to 135° diagonal wiring paths. The power grid structure 500 is the power grid structure 300 of FIG. 3 with a reduced number of vias or via arrays. In the example shown in FIG. 5, a power via 315 (or power via array) is located only at every $2^{nd}$ power intersection and a ground via 317 (or ground via array) is located only at every $2^{nd}$ ground intersection. In other embodiments, a power via 315 (or power via array) is located at every Dth power intersection and a ground via 317 (or ground via array) is located at every Dth ground intersection, D being an integer greater than 1.

The reduced number of vias (or via arrays) in the power grid structure 500 relative to the power grid structure 300 of FIG. 3 allows larger wiring tracks between the vias of the power grid structure 500. The vias (or via arrays) of the power grid structure 400 have been located in a particular pattern that is especially beneficial to 135° diagonal wiring paths. Such a pattern of vias can be produced by a predetermined formula, as described in relation to FIG. 7. A 45° diagonal direction arrow 530 and a 135° diagonal direction arrow 532 illustrate how a 135° diagonal wiring track is larger than a 45° diagonal wiring track between vias of the power grid structure 500.

Figure 6:
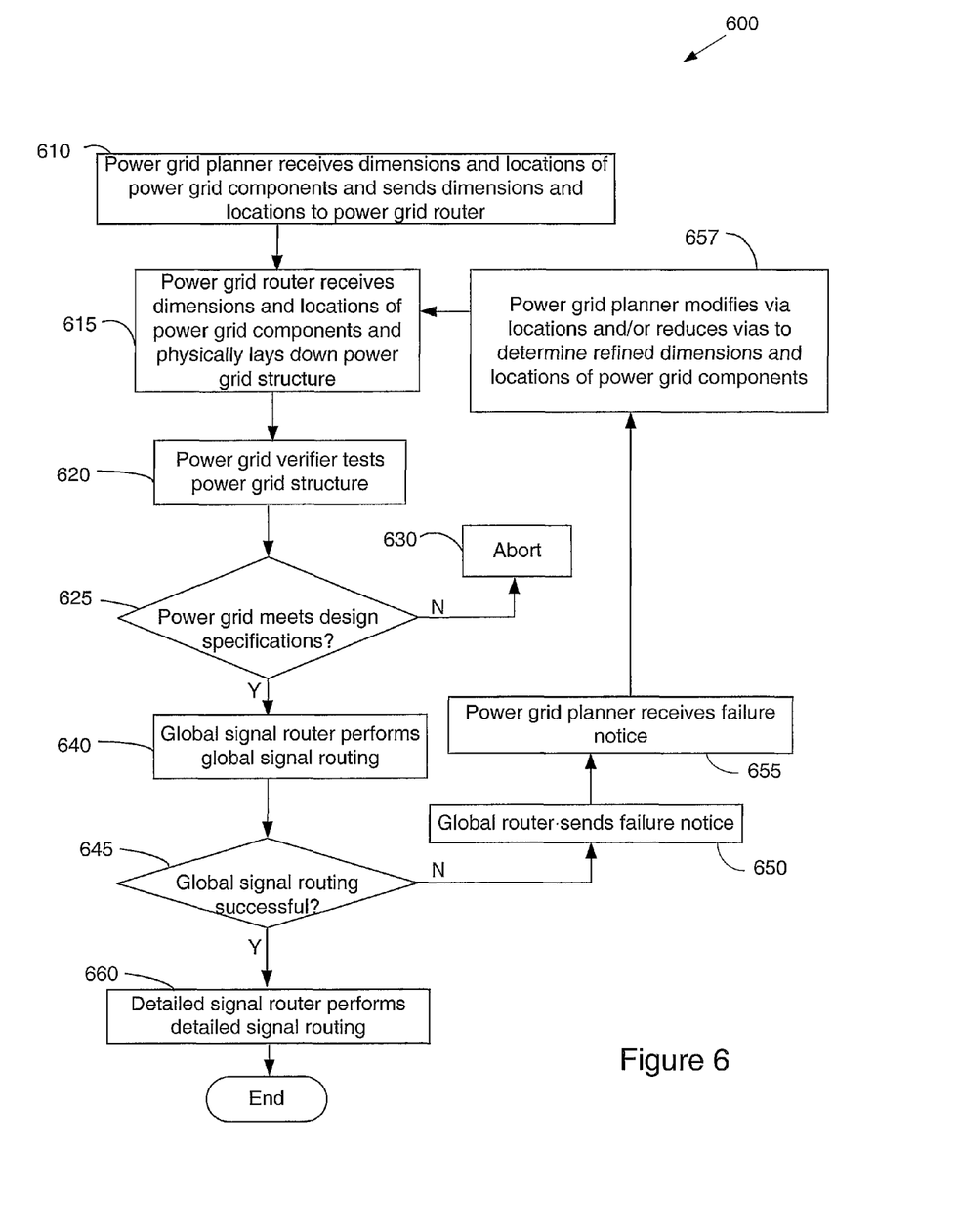
FIG. 6 shows a general process for defining and producing a power grid structure of an IC with a reduced number of vias in accordance with the present invention.

FIG. 6 shows a general process 600 for defining and producing a power grid structure of an IC with a reduced number of vias (or via arrays) in accordance with the present invention. The general process 600 thus reduces the area of the power grid structure and the diagonal wiring blockage caused by the power grid structure while still meeting design specifications. The general process 600 includes processes of a power grid planner, power grid router, power grid verifier, and global signal router that are used iteratively to define and produce a power grid structure.

The general process 600 begins when the power grid planner receives (at 610) dimensions and locations of power grid components (stripes, rails, and vias) for each IC layer and sends the dimensions and locations to the power grid router (for example, as a set of commands). The dimensions and locations of power grid components may be defined by conventional methods or by methods as described in the aforementioned patent application titled "Method and Apparatus for Defining Power Grid Structures of Integrated Circuits." The received dimensions and locations of power grid components will define locations for a particular number of vias or via arrays and define a particular pattern of vias in the power grid structure. The received dimensions and locations place a power via (or power via array) at every power stripe and power rail intersection and a ground via (or ground via array) at every ground stripe and ground rail intersection.

The power grid router receives (at 615) dimensions and locations of the power grid components (for example, as a set of commands) and physically lays down the power grid components for each layer of the IC according to the received dimensions and locations. The power grid verifier then tests (at 620) the resulting power grid structure to determine if the power grid structure meets the design specifications (i.e., minimum specifications that the power grid structure must meet in order to be acceptable for use in the IC). The power grid verifier may be comprised of, for example, a Spice-based simulator. If the power grid verifier determines (at 625—No) that the power grid structure does not meet the design specifications, the general process 600 aborts (at 630). The general process 600 aborts since a power grid structure defined by the received dimensions and locations can not be further reduced (i.e., by reducing the number of vias or via arrays) and still meet design specifications.

If the power grid verifier determines (at 625—Yes) that the power grid structure meets the design specifications, the global signal router performs (at 640) global signal routing operations for each signal net of the IC. For each signal net, the global signal router generates a "loose" route for interconnect lines that are to connect the signal pins of the signal net. The routes for the interconnect lines define routes for signal wiring that interconnect electronic and circuit components of the IC.

The global signal router then tests (at 645) to determine whether the global signal routing was successful. This can be determined, for example, by determining and comparing a wiring capacity and wiring demand for each layer of the IC. Wiring capacity is the amount of wiring tracks available on a layer whereas wiring demand is the amount of wiring that the global signal router is attempting to route through a layer. If the wiring demand exceeds the wiring capacity on a layer of the IC, the global signal routing is not successful on that layer. If the wiring demand exceeds the wiring capacity on any layer of the IC, the global signal router determines (at 645—No) that the global signal routing for the IC is not successful. For example, if the wiring demand exceeds the wiring capacity only on layer 5 (layer 5 having 135° diagonal preferred wiring), the global signal router determines that the global signal routing is not successful. The global signal router then sends (at 650) a failure notice to the power grid planner.

The power grid planner receives (at 655) the failure notice. The power grid planner then modifies (at 657) via or via array locations and/or reduces the number of vias or via arrays of the power grid structure to determine refined dimensions and locations of power grid components. The power grid planner may change the locations of the vias or via arrays to be beneficial to 45° diagonal preferred wiring or 135° diagonal preferred wiring. For example, if the wiring demand exceeds the wiring capacity on layer 5 (layer 5 having 135° diagonal preferred wiring), the power grid planner may change the locations of the vias or via arrays to be beneficial to 135° diagonal preferred wiring (as shown in FIGS. 2 and 5).

Alternatively, or in addition, the power grid planner may reduce the number of vias or via arrays in the power grid structure by locating a power via (or power via array) only at every Dth power intersection and a ground via (or ground via array) only at every Dth ground intersection, D being an integer greater than 1. The power grid planner may modify (at 657) the via or via array locations and/or reduce the number of vias or via arrays by methods of trial and error or by using predetermined formulas, as described below in relation to FIG. 7. The power grid planner determines (at 657) refined dimensions and locations for the power grid components given any modifications that were made.

The general process 600 then repeats steps 615 through 645. Therefore, the dimensions and locations of the power grid components are refined through an iterative process between the power grid planner, the power grid router, the power grid verifier, and the global signal router (where an iterative loop is formed by steps 615 through 657) that modifies the via or via array locations and/or reduces the number of vias or via arrays until the global signal routing is successful. The general process 600 produces a power grid structure with a reduced number of vias or via arrays that still meets design specifications.

If the wiring demand does not exceed the wiring capacity on any layer of the IC, the global signal router determines (at 645—Yes) that the global signal routing is successful. A detailed signal router then performs (at 660) detailed signal routing to create specific individual routes for each signal net. Then the general process 600 ends.

Figure 7:
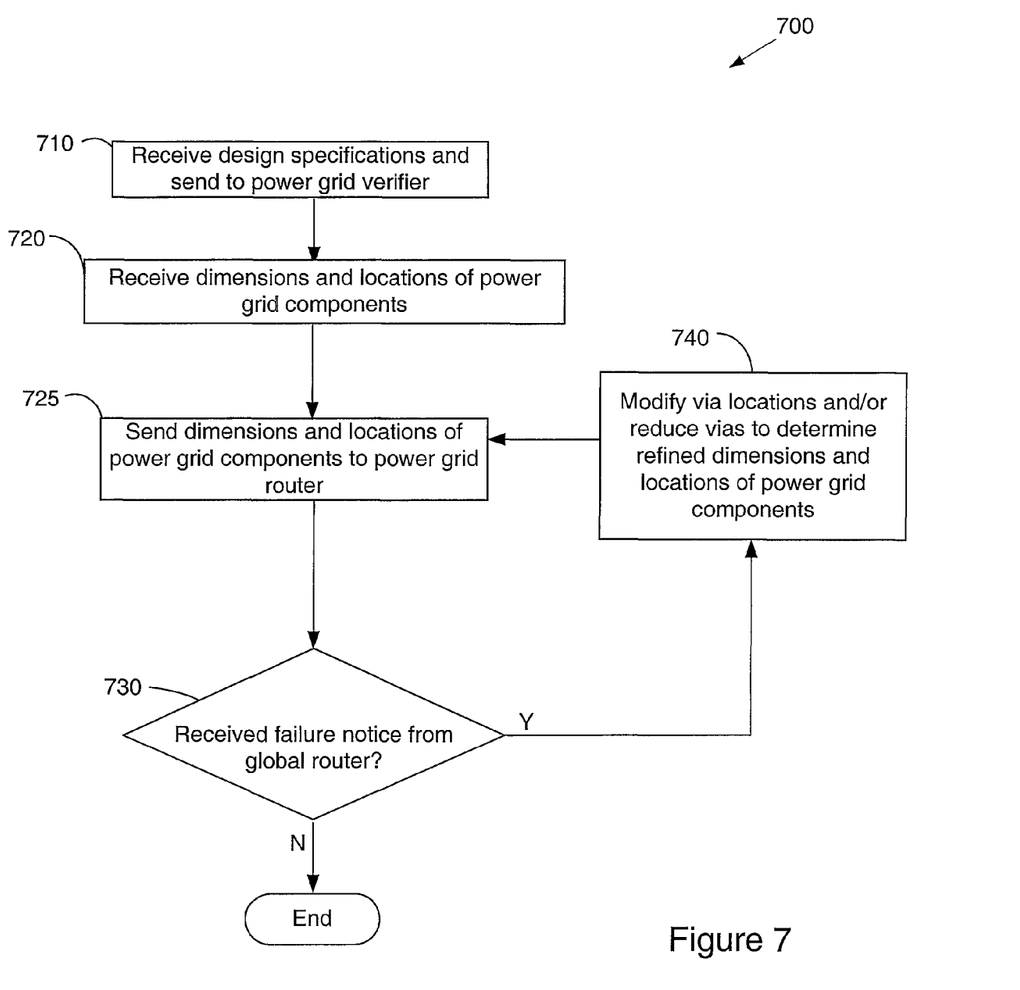
FIG. 7 shows a process of a power grid planner for defining and producing a power grid structure of an IC with a reduced number of vias in accordance with the present invention.

FIG. 7 shows a process 700 of a power grid planner for defining and producing a power grid structure of an IC with a reduced number of vias (or via arrays) in accordance with the present invention. The process 700 begins when the power grid planner receives (at 710) design specifications for the power grid structure and sends the design specifications to the power grid verifier. Design specifications are minimum specifications that the power grid structure must meet in order to be acceptable for use in the IC. Different design specifications may be specified for a power net (a collection of power pins that need to be connected in the IC) and a ground net (a collection of ground pins that need to be connected in the IC). Design specifications may include, for example, a threshold voltage drop across the power grid structure, a threshold voltage required at each power pin of an electronic or circuit component of the IC, and/or a switching frequency threshold of the IC. Design specifications may also include, for example, a threshold electro-migration value which reflects metal breakdown due to Joule heat, operational temperature, or its operational year total and/or a threshold switching noise value which reflects voltage reduction on a power supply due to a current change during logic switching.

The power grid planner then receives (at 720) dimensions and locations of power grid components (stripes, rails, and vias) for each IC layer. The dimensions and locations of power grid components may be defined by conventional methods or methods as described in the aforementioned patent application titled "Method and Apparatus for Defining Power Grid Structures of Integrated Circuits." The dimensions and locations of power grid components define the power grid structure to be produced for the IC. The received dimensions and locations of power grid components will define locations for a particular number of vias or via arrays and define a particular pattern of vias in the power grid structure. The received dimensions and locations place a power via (or power via array) at every power stripe and power rail intersection and a ground via (or ground via array) at every ground stripe and ground rail intersection. The power grid planner then sends (at 725) the dimensions and locations to the power grid router (for example, as a set of commands).

As described above in relation to FIG. 6, the power grid router receives then the dimensions and locations of the power grid components and physically lays down the power grid structure components for each IC layer. The power grid verifier tests the resulting power grid structure, and the global signal router performs global signal routing operations if the power grid verifier determines that the power grid structure meets the design specifications. If the global signal routing was not successful, the global signal router sends to the power grid planner a failure notice. Therefore, after step 725, the power grid planner checks (at 730) to determine if a failure notice has been received from the global signal router.

If so, the power grid planner modifies (at 740) via or via array locations and/or reduces the number of vias or via arrays of the power grid structure to determine refined dimensions and locations of power grid components. For example, the power grid planner may reduce the number of vias or via arrays in the power grid structure by locating a power via (or power via array) only at every Dth power intersection and a ground via (or ground via array) only at every Dth ground intersection, D being an integer greater than 1.

In other embodiments, the power grid planner changes the locations of the vias or via arrays to be beneficial to 45° diagonal preferred wiring or 135° diagonal preferred wiring. For example, if the power grid structure only has a power via (or power via array) located at every $2^{nd}$ power intersection and a ground via (or ground via array) located at every $2^{nd}$ ground intersection and the locations of the vias are beneficial to 45° diagonal preferred wiring (as shown in FIG. 4), the power grid structure may change the locations of the vias to be beneficial to 135° diagonal preferred wiring (as shown in FIG. 5). In the first iteration of an iterative loop formed by steps 725, 730, and 740, however, the power grid planner will only reduce the number of vias and will not change the locations of the vias since the power grid structure in the first iteration has a power via at every power intersection and a ground via at every ground intersection so that the locations of vias can not be modified.

The power grid planner may modify (at 740) the via or via array locations and/or reduce the number of vias or via arrays by methods of trial and error or by using predetermined formulas. Predetermined formulas for specific situations may be used by the power grid planner to produce specific results. For example, for locating a power via (or power via array) only at every Dth power intersection and a ground via (or ground via array) only at every Dth ground intersection, where D is an even integer greater than 1 and the power stripes and ground stripes of the power grid structure are evenly spaced, the following predetermined formulas and conditions may be used:

Power vias (or power via arrays) are placed at locations defined by (PXi, PYj) where:

$$PXi = (D-1)*2*i$$

$$PYj = (2*D*j) + 2*(D - (i \bmod D));$$

$$0 \leq i \leq \text{ceil}\left(\frac{Nc}{2*(D-1)}\right)$$

and i is an integer;

$$-1 \leq j \leq \text{ceil}\left(\frac{Nr - 2*D}{2*D}\right)$$

and j is an integer;

Nc is equal to the width of an IC layout, where one unit of Nc is equal to the spacing width between rails of the power grid structure and the width is in terms of x coordinates of the IC layout;

Nr is equal to the length of an IC layout, where one unit of Nr is equal to the spacing width between rails of the power grid structure and the length is in terms of y coordinates of the IC layout;

a floor(x) function returns a floating-point value representing the largest integer that is less than or equal to x; and a ceil(x) function returns a floating-point value representing the smallest integer that is greater than or equal to x.

For all computed locations of power vias (or power via arrays), discard any locations that falls outside:

$0 \leq PXi \leq Nc$ and $0 \leq PYi \leq Nr$

Ground vias (or ground via arrays) are placed at locations defined by (Gn3i, GndYj) where:

$GndXi = (D-1)*(2*i+1);$ $GndYj = (2*D*j) + (D-1) + 2*(D-1)*(i \bmod D);$ $$0 \leq i \leq \text{ceil}\left(\frac{\frac{Nc}{D-1} - 1}{2}\right)$$

and i is an integer; and $$\text{floor}\left(\frac{1-D}{2}\right) \leq j \leq \text{ceil}\left(\frac{Nr - (D-1) - 2*(D-1)*(D-1)}{2*D}\right);$$

and j is an integer;

For all computed locations of ground vias (or ground via arrays), discard any locations that falls outside:

$0 \leq GndXi \leq Nc$ and $0 \leq GndYi \leq Nr$

For example, with D=4, Nr=29, Nc=39, we have:

Locations of power vias or power via arrays at (PXi, PYj)=(0 0) (0 8) (0 16) (0 24) (6 6) (6 14) (6 22) (12 4) (12 12) (12 20) (12 28) (18 2) (18 10) (18 18) (18 26) (24 0) (24 8) (24 16) (24 24) (30 6) (30 14) (30 22) (36 4) (36 12) (36 20) (36 28); and Locations of ground vias or ground via arrays at (Gn3i, GndYj)=(3 3) (3 11) (3 19) (3 27) (9 1) (9 9) (9 17) (9 25) (15 7) (15 15) (15 23) (21 5) (21 13) (21 21) (21 29) (27 3) (27 11) (27 19) (27 27) (33 1) (33 9) (33 17) (33 25) (39 7) (39 15) (39 23).

In using the above predetermined formulas and conditions, to locate vias (or via arrays) in a pattern that is beneficial to 45° diagonal wiring paths, the y coordinates of the IC layout increases from south (the bottom of the IC layer) to north (the top of the IC layer). To locate vias (or via arrays) in a pattern that is beneficial to 135° diagonal wiring paths, the y coordinates of the IC layout increases from north (the top of the IC layer) to south (the bottom of the IC layer). In other embodiments, other predetermined formulas are used by the power grid planner. For example, a predetermined formula for when D is an odd integer and/or the power stripes and ground stripes of the power grid structure are not evenly spaced may be used by the power grid planner.

After the power grid planner modifies (at 740) via or via array locations and/or reduces the number of vias or via arrays of the power grid structure to determine refined dimensions and locations of power grid components, the power grid planner repeats steps 725 and 730. An iterative loop is formed by steps 725, 730, and 740 to modify the power grid structure until the global signal routing is successful.

If the power grid planner did not receive (at 730—No) a failure notice from the global signal router, the process 700 ends.

II. As stated above, multiple vias are typically arranged in a via array that causes significant diagonal wiring blockage near the edges of the via array. FIG. 8 shows a top view of a conventional via array 800 as enclosed by a rectangular bounding box 805, the via array 800 being comprised of multiple vias 810. The bounding box 805 has an aspect ratio defined by a width of the bounding box 805 divided by a length of the bounding box 805. The aspect ratio of a bounding box 805 enclosing a conventional via array is typically not approximately equal to 1. Diagonal direction arrows 820 illustrate how diagonal wiring paths are blocked by vias 810 near the edges of the via array 800. In the example shown in FIG. 8, there are 5 vias 810 in the via array 800.

Figure 9A:
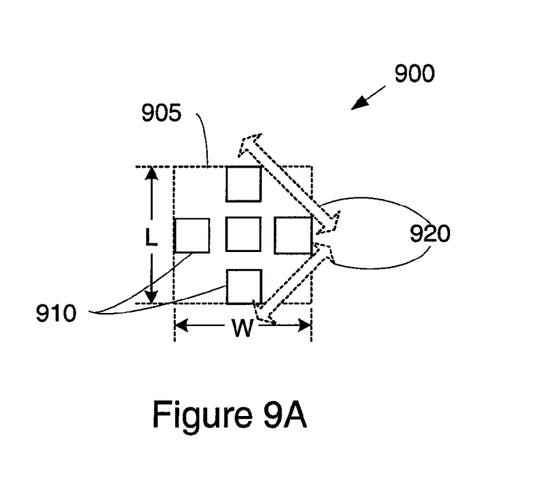
FIGS. 9A and 9B show a top view of a via array that is beneficial to diagonal wiring paths.
Figure 9B:
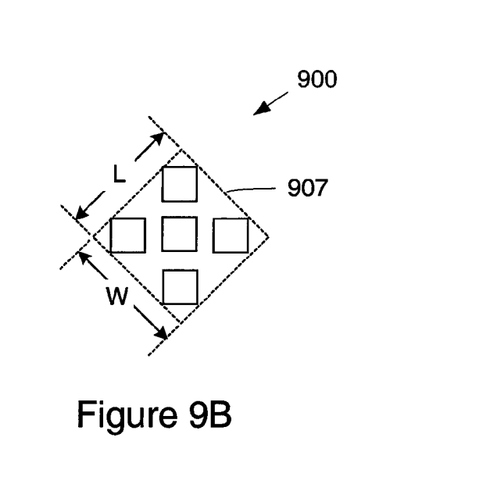

FIGS. 9A and 9B show a top view of a via array 900 that is beneficial to diagonal wiring paths. The via array 900 is enclosed by a bounding box 905 and 907 and is comprised of multiple vias 910. In the example shown in FIG. 9, there are 5 vias 910 in the via array 900, which is the same number of vias in the conventional via array 800 of FIG. 8.

The bounding box 905 and 907 encloses all vias 910 of the via array 900 and each side of the bounding box 905 and 907 touches a side of at least one via 910. The sides of the bounding box 905 of FIG. 9A are parallel to sides of the vias 910 and is referred to as a Manhattan bounding box. The sides of the bounding box 907 of FIG. 9B are diagonal to sides of the vias 910 and is referred to as a diagonal bounding box.

The bounding box 905 and 907 has an aspect ratio defined by a width of the bounding box divided by a length of the bounding box. The aspect ratio of the bounding box 905 and 907 enclosing the via array 900 is approximately equal to 1. This is true whether the bounding box is a Manhattan bounding box (as shown in FIG. 9A) or a diagonal bounding box 907 (as shown in FIG. 9B). When the aspect ratio of a bounding box enclosing a via array is approximately equal to 1, there is less diagonal wiring blockage near the edges of the via array. Diagonal direction arrows 920 illustrate how diagonal wiring tracks can be routed near the edges of the via array 900.

Figure 10:
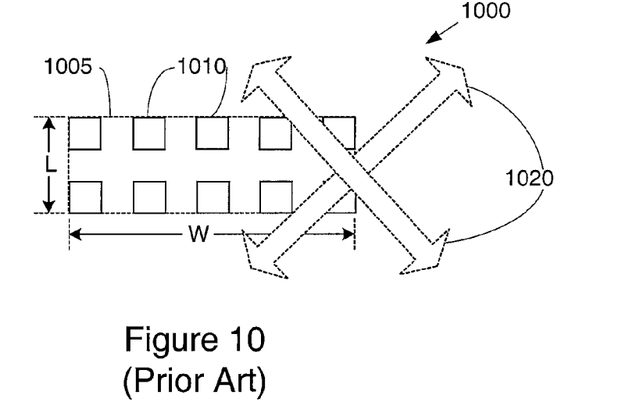
FIG. 10 shows a top view of another conventional via array.

FIG. 10 shows a top view of another conventional via array 1000. The via array 1000 is enclosed by a rectangular bounding box 1005 and is comprised of multiple vias 1010. Note that the bounding box 1005 has an aspect ratio that is not approximately equal to 1 and that there are 10 vias 1010 in the via array 1000. Diagonal direction arrows 1020 illustrate how diagonal wiring paths are blocked by vias 1010 near the edges of the via array 1000.

Figure 11A:
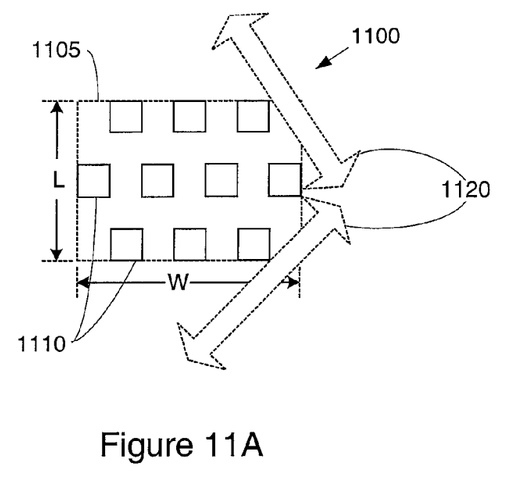
FIGS. 11A and 11B show a top view of another via array that is beneficial to diagonal wiring paths.
Figure 11B:
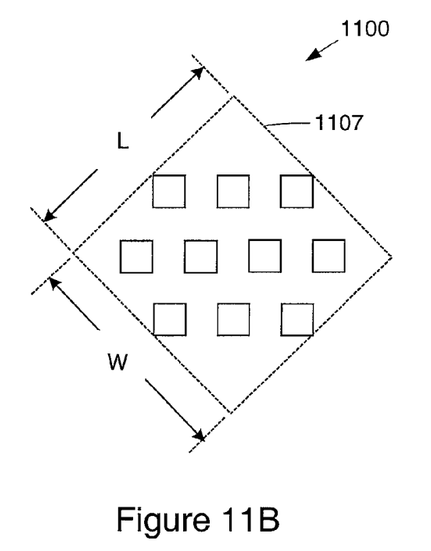

FIGS. 11A and 11B show a top view of another via array 1100 that is beneficial to diagonal wiring paths. The via array 1100 is enclosed by a Manhattan bounding box 1105 (as shown in FIG. 11A) and/or a diagonal bounding box 1107 (as shown in FIG. 11B) and is comprised of multiple vias 1110. Note that the number of vias 1110 (10) in the via array 1100 is the same number of vias 1110 in the conventional via array 1000 of FIG. 10. The aspect ratio of the Manhattan bounding box 1105 and the diagonal bounding box 1107 is approximately equal to 1. Diagonal direction arrows 1120 illustrate how diagonal wiring tracks can be routed near the edges of the via array 1100.

In the embodiments described above, the power grid structure is described in relation to a six-layer wiring model that has horizontal wiring on wiring layer 1, vertical wiring on wiring layer 2, horizontal wiring on wiring layer 3, 45° diagonal wiring on wiring layer 4, and 135° diagonal wiring on wiring layer 5. One of ordinary skill in the art will realize that the power grid structure can be used in other wiring models in other embodiments. In some embodiments, an interconnect line is "diagonal" if it forms an angle other than 0° or 90° with respect to the layout's Cartesian coordinate axes, which are typically parallel with the layout's boundary and/or the boundary of the layout's expected IC. A component or interconnect line is "horizontal" or "vertical" if it forms an angle of 0° or 90° with respect to one of the coordinate axes of the layout.

In some embodiments described above, stripes of a power grid structure are positioned vertically (i.e., parallel to the layout's y-coordinate axis) across a top layer of the IC and rails of a power grid structure are positioned horizontally (i.e., parallel to the layout's x-coordinate axis) across a lower layer of the IC. One of ordinary skill in the art will realize that the stripes may be positioned horizontally and/or be laid on a different layer or on multiple layers of the IC in other embodiments. One of ordinary skill in the art will also realize that the rails may be positioned vertically and/or may be laid on a different layer or on multiple layers of the IC in other embodiments.

As used in the description above, the term "intersection" refers to a location where a stripe and rail cross in terms of an IC layout's x and y-coordinate axes, and does not refer to an actual physical intersection of the stripe and rail.

Several embodiments have been described above in relation to power grid structures having a reduced number of vias and having vias located in such a way as to be especially beneficial to 45° or 135° diagonal wiring paths. These embodiments may be combined with methods for defining power grid structures having minimized power grid structure areas and minimized diagonal wiring blockage caused by the power grid structure while still meeting design specifications. The above described embodiments may also be combined with methods for determining dimensions and locations of power grid components using a power grid formula and a set of constraints as used in an iterative process involving a power grid planner, a power grid router, a power grid verifier, and a global signal router. Such methods are described in U.S. patent application Ser. No. 10/452,100, now issued as U.S. Pat. No. 7,003,748, entitled "Methods and Apparatus for Defining Manhattan Power Grid Structures Beneficial to Diagonal Signal Wiring," filed herewith and hereby expressly incorporated herein by reference.

In addition, the above described embodiments may be combined with methods for defining power grid structures having diagonal stripes placed on one or more layers of an IC or with methods for defining power stripes having non-uniform widths and/or non-uniform spacing widths on a layer of the IC. Such methods are described in U.S. patent application Ser. No. 10/452,848, now issued as U.S. Pat. No. 7,086,024, entitled "Methods and Apparatus for Defining Power Grid Structures Having Diagonal Stripes," filed herewith and hereby expressly incorporated herein by reference.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of defining a power grid structure for use in an integrated circuit, the power grid structure comprising a plurality of stripes and a plurality of rails, the method comprising:
   at a computing device, determining locations of vias that connect the plurality of stripes to the plurality of rails at stripe and rail intersections, wherein the stripe and rail intersections are formed by the plurality of rails that are positioned perpendicularly to the plurality of stripes, wherein the vias are located in a particular pattern so that a first type of diagonal wiring track between the vias is larger than a second type of diagonal wiring track between the vias.

2. The method of claim 1, wherein the first type of diagonal wiring track is a 45° diagonal wiring track and the second type of diagonal wiring track is a 135° diagonal wiring track.

3. The method of claim 1, wherein the first type of diagonal wiring track is a 135° diagonal wiring track and the second type of diagonal wiring track is a 45° diagonal wiring track.

4. The method of claim 1, wherein the determining is performed using a predetermined formula.

5. The method of claim 1, wherein the vias are located at some but not all of the stripe and rail intersections.

6. An integrated circuit comprising a via array, the via array comprising a plurality of vias, each via being a component of a power grid structure for the integrated circuit, wherein:
   the via array is enclosed by a bounding box having an aspect ratio defined by a width of the bounding box divided by a length of the bounding box, the aspect ratio being approximately equal to 1.

7. The integrated circuit of claim 6, wherein the aspect ratio is less than 2.

8. The integrated circuit of claim 6, wherein the aspect ratio is less than 1.5.

9. The integrated circuit of claim 6, wherein the aspect ratio is less than 1.2.

10. The integrated circuit of claim 6, wherein each via in the via array comprises a plurality of sides, wherein each side of the bounding box touches a side of at least one via in the via array and each side of the bounding box is parallel to at least one side of at least one via.

11. The integrated circuit of claim 6, wherein each via in the via array comprises a plurality of sides, wherein each side of the bounding box touches at least one via in the via array and each side of the bounding box is diagonal to at least one side of at least one via.

12. The integrated circuit of claim 11, wherein the bounding box is a first bounding box, wherein each via in the via array comprises a plurality of sides, wherein the via array is enclosed by a second bounding box having sides that are parallel to the sides of the vias in the via array, the second bounding box having an aspect ratio being approximately equal to 1.

13. An integrated circuit comprising a power grid structure, the power grid structure comprising:
   a plurality of stripes;
   a plurality of rails that are positioned perpendicular to the plurality of stripes so that a plurality of stripe and rail intersections are formed; and
   a plurality of vias that connect the plurality of stripes to the plurality of rails, wherein the vias are located in a particular pattern so that a first type of diagonal wiring track between the vias is larger than a second type of diagonal wiring track between the vias.

14. The integrated circuit of claim 13, wherein a via is located only at every Dth stripe and rail intersection, D being an integer greater than 1.

15. The integrated circuit of claim 13, wherein distances between every air of adjacent stripes are uniform throughout the power grid structure.

16. The integrated circuit of claim 13, wherein distances between every air of adjacent stripes are not uniform throughout the power grid structure.

17. The integrated circuit of claim 13, wherein the first type of diagonal wiring track is a 45° diagonal wiring track and the second type of diagonal wiring track is a 135° diagonal wiring track.

18. The integrated circuit of claim 13, wherein the first type of diagonal wiring track is a 135° diagonal wiring track and the second type of diagonal wiring track is a 45° diagonal wiring track.

19. The integrated circuit of claim 13, wherein a distance between each pair of adjacent stripes is an integer multiple of a distance between each pair of adjacent rails.

20. The integrated circuit of claim 13, wherein the particular pattern of vias is determined by a predetermined formula.

* * * * *